United States Patent
Zhang et al.

(10) Patent No.: US 10,515,043 B2
(45) Date of Patent: Dec. 24, 2019

(54) SMART INTERFACE CARD CONTROL METHOD AND APPARATUS THROUGH A VIRTUALIZED MANAGEMENT INTERFACE

(71) Applicant: HUAWEI TECHNOLOGIES CO., LTD., Shenzhen (CN)

(72) Inventors: Wei Zhang, Hangzhou (CN); Yixiang Liao, Hangzhou (CN); Ben Feng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/022,715

(22) Filed: Jun. 29, 2018

(65) Prior Publication Data

US 2018/0307643 A1    Oct. 25, 2018

Related U.S. Application Data

(63) Continuation of application No. PCT/CN2016/098355, filed on Sep. 7, 2016.

(30) Foreign Application Priority Data

Dec. 31, 2015  (CN) .......................... 2015 1 1030729

(51) Int. Cl.
*G06F 3/00*  (2006.01)
*G06F 13/40*  (2006.01)
(Continued)

(52) U.S. Cl.
CPC .......... *G06F 13/4068* (2013.01); *G06F 13/10* (2013.01); *G06F 13/102* (2013.01);
(Continued)

(58) Field of Classification Search
CPC ............... G06F 13/4068; G06F 13/102; G06F 13/4282; G06F 13/10; G06F 2213/0042;
(Continued)

(56) References Cited

U.S. PATENT DOCUMENTS 7,213,766 B2 * 5/2007 Ryan .................... G06F 13/385
235/472.02
7,481,363 B2 * 1/2009 Zuili .................... G06Q 20/341
235/380

(Continued)

FOREIGN PATENT DOCUMENTS

CN         1447569 A    10/2003
CN       102099783 A     6/2011
(Continued)

*Primary Examiner* — Jing-Yih Shyu
(74) *Attorney, Agent, or Firm* — Kilpatrick Townsend & Stockton LLP

(57) ABSTRACT

Embodiments can provide a smart interface card control method and apparatus. Under such a method or apparatus, after a smart interface card is inserted into a smart interface card slot of a host, a virtualized management interface can be registered with the host using a protocol stack of a preset type. A virtual link can be created to connect a baseboard management controller management interface to the virtual link. A management address configuration instruction sent by the host can be received for configuring a management address of the management interface. A control instruction sent by the host by using the management address can be received, and the control instruction to the BMC management interface can be sent by using the virtual link. According to the foregoing smart interface card control method and apparatus, scalability of the smart interface card can be improved.

15 Claims, 5 Drawing Sheets

(51) Int. Cl.
*G06F 13/10* (2006.01)
*G06F 13/42* (2006.01)
(52) U.S. Cl.
CPC .. *G06F 13/4282* (2013.01); *G06F 2213/0016* (2013.01); *G06F 2213/0026* (2013.01); *G06F 2213/0036* (2013.01); *G06F 2213/0042* (2013.01)
(58) Field of Classification Search
CPC ..... G06F 2213/0036; G06F 2213/0016; G06F 2213/0026
See application file for complete search history.

(56) References Cited

U.S. PATENT DOCUMENTS

| | | | | |
|---|---|---|---|---|
| 2005/0289646 | A1* | 12/2005 | Zimmer | G06F 12/145 726/9 |
| 2006/0208066 | A1* | 9/2006 | Finn | G06K 7/0004 235/380 |
| 2007/0002832 | A1* | 1/2007 | Sylvain | H04L 63/0892 370/352 |
| 2010/0014525 | A1 | 1/2010 | Rehman et al. | |
| 2012/0047307 | A1* | 2/2012 | Tu | G06F 21/79 710/311 |
| 2012/0266212 | A1* | 10/2012 | Jiang | H04L 63/0853 726/3 |
| 2013/0332602 | A1 | 12/2013 | Nakil et al. | |
| 2014/0149985 | A1 | 5/2014 | Takeuchi et al. | |
| 2016/0239337 | A1 | 8/2016 | Gu et al. | |
| 2016/0359743 | A1 | 12/2016 | Dong et al. | |

FOREIGN PATENT DOCUMENTS

| | | |
|---|---|---|
| CN | 103931144 A | 7/2014 |
| CN | 104205753 A | 12/2014 |
| CN | 104378218 A | 2/2015 |
| CN | 104521196 A | 4/2015 |
| CN | 104580124 A | 4/2015 |
| CN | 104679438 A | 6/2015 |

* cited by examiner

SMART INTERFACE CARD CONTROL METHOD AND APPARATUS THROUGH A VIRTUALIZED MANAGEMENT INTERFACE

CROSS-REFERENCE TO RELATED APPLICATIONS

This application is a continuation of International Application No. PCT/CN2016/098355, filed on Sep. 7, 2016, which claims priority to Chinese Patent Application No. 201511030729.4, filed on Dec. 31, 2015. The disclosures of the aforementioned applications are hereby incorporated by reference in their entireties.

TECHNICAL FIELD

The present invention relates to the field of smart interface card technologies, and in particular, to a smart interface card control method and apparatus.

BACKGROUND

With development of computer technologies and communications technologies, a smart interface card (SIC) becomes increasingly complex. In addition to a powerful SOC chip, a hardware architecture of an existing smart interface card includes a DDR memory, an SSD hard disk, a CPLD, a BMC used for management, various types of voltage/temperature monitoring chips, and various peripherals such as a network port and an SAS, and configuration of the existing smart interface card is close to that of a small server.

The smart interface card works after being inserted into a corresponding interface slot on a server, and the server needs to establish a channel to the smart interface card to transmit a control instruction, so as to manage the smart interface card. In a conventional technology, there are two management manners: in-band management and out-of-band management. In an in-band management manner, a specific register configured by a manufacturer is disposed on the smart interface card, and a host controls and manages the smart interface card by reading/writing the register by using corresponding management software provided by the manufacturer. In an out-of-band management manner, an Inter-Integrated Circuit (I2C, a two-line serial bus developed by Philips) bus interface is usually further disposed on the smart interface card. After the smart interface card is inserted into the corresponding slot of the host, an additional line is further needed to constitute an I2C bus link between the smart interface card and the host, and then the control instruction is transmitted by using the additional I2C bus.

It can be learned that, in the in-band management manner of the smart interface card, the specific register needs to be disposed on the smart interface card, and the host can perform management only after the corresponding management software is installed. After multiple smart interface cards from different manufacturers are inserted, different management software from the multiple manufacturers needs to be installed to separately perform management. However, in the out-of-band management manner of the smart interface card, the host needs to provide an additional I2C bus interface for a control purpose. If the host is not equipped with the I2C bus interface or does not have an idle I2C bus interface, the host cannot manage the inserted smart interface card. Therefore, in the conventional technology, a problem of poor scalability exists in both the in-band management manner and the out-of-band management manner.

SUMMARY

Based on this, to resolve the foregoing problem, in a conventional technology, that scalability is poor because an in-band or an out-of-band management manner of a smart interface card is not applicable to a server of a common type, a smart interface card control method is provided.

A first aspect of embodiments of the present invention discloses a smart interface card control method, including:

after a smart interface card is inserted into a smart interface card slot of a host, registering a virtualized management interface with the host by using a protocol stack of a preset type;

creating a virtual link, and connecting a baseboard management controller BMC management interface to the virtual link;

receiving a management address configuration instruction sent by the host, and configuring a management address of the management interface according to the management address configuration instruction; and receiving a control instruction that is sent by the host by using the management address, and sending the control instruction to the BMC management interface by using the virtual link.

With reference to the first aspect of the embodiments of the present invention, in a first possible implementation of the first aspect of the embodiments of the present invention, a protocol stack type of the virtualized management interface includes one of an Ethernet interface, a small computer system interface SCSI, a Universal Serial Bus USB interface, an I2C interface, or an LPC interface.

With reference to an implementation of the first aspect of the embodiments of the present invention, in a second possible implementation of the first aspect of the embodiments of the present invention, a type of the smart interface card slot includes a PCIE interface slot or a USB interface slot.

With reference to the first aspect and the first or the second possible implementation of the first aspect of the embodiments of the present invention, in a third possible implementation of the first aspect of the embodiments of the present invention, the type of the smart interface card slot is the PCIE interface slot; and the registering a virtualized management interface with the host by using a protocol stack of a preset type comprise:

registering the virtualized management interface on a PCIE interface of the host by using the protocol stack of the preset type.

With reference to the first aspect and the third possible implementation of the first aspect of the embodiments of the present invention, in a fourth possible implementation of the first aspect of the embodiments of the present invention, the protocol stack type of the virtualized management interface is the Ethernet interface;

the creating a virtual link, and connecting a baseboard management controller BMC management interface to the virtual link comprise:

creating a virtual local area network link, and connecting an Ethernet interface of the BMC management interface to the virtual local area network link; and the sending the control instruction to the BMC management interface by using the virtual link comprise:

sending the control instruction to the Ethernet interface of the BMC management interface by using the virtual local area network link.

With reference to the first aspect and the fourth possible implementation of the first aspect of the embodiments of the present invention, in a fifth possible implementation of the first aspect of the embodiments of the present invention, the creating a virtual local area network link further includes:

connecting an Ethernet interface of a system on chip SOC management interface to the virtual local area network link.

With reference to the first aspect and the fourth possible implementation of the first aspect of the embodiments of the present invention, in a sixth possible implementation of the first aspect of the embodiments of the present invention, the configuring a management address of the management interface according to the management address configuration instruction comprise:

configuring an Internet Protocol IP address of the management interface according to the management address configuration instruction; and the receiving a control instruction that is sent by the host by using the management address comprise:

receiving a Remote Management Control Protocol RMCP-based control instruction that is sent by the host by using the configured IP address.

With reference to the first aspect and the third possible implementation of the first aspect of the embodiments of the present invention, in a seventh possible implementation of the first aspect of the embodiments of the present invention, the protocol stack type of the virtualized management interface is the SCSI;

the creating a virtual link, and connecting a baseboard management controller BMC management interface to the virtual link comprise:

creating a virtual SCSI bus, and connecting the BMC management interface to the virtual SCSI bus; and the sending the control instruction to the BMC management interface by using the virtual link comprise:

sending the control instruction to the BMC management interface by using the virtual SCSI bus.

With reference to the first aspect and the seventh possible implementation of the first aspect of the embodiments of the present invention, in an eighth possible implementation of the first aspect of the embodiments of the present invention, the configuring a management address of the management interface according to the management address configuration instruction comprise:

configuring a SCSI read/write address of the management interface according to the management address configuration instruction; and the receiving a control instruction that is sent by the host by using the management address comprise:

receiving a SCSI access request that includes the control instruction and that is sent by the host by using the configured SCSI read/write address.

In addition, to resolve the foregoing problem, in a conventional technology, that scalability is poor because an in-band or an out-of-band management manner of a smart interface card is not applicable to a server of a common type, a smart interface card control apparatus is specially provided.

A second aspect of the embodiments of the present invention discloses a smart interface card control apparatus, including:

an interface registration module, configured to register, after a smart interface card is inserted into a smart interface card slot of a host, a virtualized management interface with the host by using a protocol stack of a preset type;

a virtual link creation module, configured to: create a virtual link, and connect a baseboard management controller BMC management interface to the virtual link;

a management address configuration module, configured to: receive a management address configuration instruction sent by the host, and configure a management address of the management interface according to the management address configuration instruction; and a control instruction forwarding module, configured to: receive a control instruction that is sent by the host by using the management address, and send the control instruction to the BMC management interface by using the virtual link.

With reference to an implementation of the second aspect of the embodiments of the present invention, in a first possible implementation of the second aspect of the embodiments of the present invention, a protocol stack type of the virtualized management interface includes one of an Ethernet interface, a small computer system interface SCSI, a Universal Serial Bus USB interface, an I2C interface, or an LPC interface.

With reference to an implementation of the second aspect of the embodiments of the present invention, in a second possible implementation of the second aspect of the embodiments of the present invention, a type of the smart interface card slot includes a PCIE interface slot or a USB interface slot.

With reference to the second aspect and the first or the second possible implementation of the second aspect of the embodiments of the present invention, in a third possible implementation of the second aspect of the embodiments of the present invention, the type of the smart interface card slot is the PCIE interface slot; and the interface registration module is further configured to register the virtualized management interface on a PCIE interface of the host by using the protocol stack of the preset type.

With reference to the second aspect and the third possible implementation of the second aspect of the embodiments of the present invention, in a fourth possible implementation of the second aspect of the embodiments of the present invention, the protocol stack type of the virtualized management interface is the Ethernet interface;

the virtual link creation module is further configured to: create a virtual local area network link, and connect an Ethernet interface of the BMC management interface to the virtual local area network link; and the control instruction forwarding module is further configured to send the control instruction to the Ethernet interface of the BMC management interface by using the virtual local area network link.

With reference to the second aspect and the fourth possible implementation of the second aspect of the embodiments of the present invention, in a fifth possible implementation of the second aspect of the embodiments of the present invention, the virtual link creation module is further configured to connect an Ethernet interface of a system on chip SOC management interface to the virtual local area network link.

With reference to the second aspect and the fourth possible implementation of the second aspect of the embodiments of the present invention, in a sixth possible implementation of the second aspect of the embodiments of the present invention, the management address configuration module is further configured to configure an Internet Protocol IP address of the management interface according to the management address configuration instruction; and the control instruction forwarding module is further configured to receive a Remote Management Control Protocol RMCP-based control instruction that is sent by the host by using the configured IP address.

With reference to the second aspect and the third possible implementation of the second aspect of the embodiments of the present invention, in a seventh possible implementation of the second aspect of the embodiments of the present invention, the protocol stack type of the virtualized management interface is the SCSI;

the virtual link creation module is further configured to: create a virtual SCSI bus, and connect the BMC management interface to the virtual SCSI bus; and the control instruction forwarding module is further configured to send the control instruction to the BMC management interface by using the virtual SCSI bus.

With reference to the second aspect and the seventh possible implementation of the second aspect of the embodiments of the present invention, in an eighth possible implementation of the second aspect of the embodiments of the present invention, the management address configuration module is further configured to configure a SCSI read/write address of the management interface according to the management address configuration instruction; and the control instruction forwarding module is further configured to receive a SCSI access request that includes the control instruction and that is sent by the host by using the configured SCSI read/write address.

Implementation of the present invention brings about the following beneficial effects:

In comparison with the in-band management manner in the conventional technology, according to the foregoing smart interface card control method and apparatus, there is no need to dispose a separate register on the smart interface card, there is no need to install management software on the host side, and the host may directly send, by using a network or the SCSI, a control instruction that complies with a general protocol, to manage the smart interface card. In comparison with the out-of-band management manner, the smart interface card directly communicates with the host by using the slot, and there is no need to occupy an additional device resource of the host. A host without an I2C interface can still perform management. Therefore, scalability is improved.

In addition, in comparison with the out-of-band management manner, the host may manage the smart interface card by using a high-bandwidth management channel such as a network or the SCSI. Bandwidth of the management channel is greatly improved when compared with that of an I2C management channel in the original out-of-band management manner.

In addition, the host may directly access a smart interface card controller or an on-board BMC module of the smart interface card, and provide comprehensive management functions that are based on a standard IPMI framework. Further, because all management channels are virtualized based on a PCIE channel, a device type (a network device, a SCSI device, or the like) that is of the smart interface card and that is presented for the host can be changed by modifying software configuration. Therefore, application is more flexible, and scalability is also improved.

In addition, the host may connect a virtual link inside the smart interface card to an external management network by using a bridge function provided by a standard OS, and add the smart interface card to the management network of a data center level, so that the management network can conveniently manage smart interface cards on multiple hosts.

DESCRIPTION OF EMBODIMENTS

The following clearly describes the technical solutions in the embodiments of the present invention with reference to accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To resolve the foregoing problem, in a conventional technology, that scalability is poor because an in-band or an out-of-band management manner of a smart interface card is not applicable to a server of a common type, in an embodiment, a smart interface card control method is specially provided. Implementation of the method may depend on a computer program, and the computer program may run on a smart interface card SIC. The computer program may be stored in a storage chip of the smart interface card SIC in a form of firmware. Correspondingly, a host needs only to update a corresponding driver of the smart interface card SIC.

Figure 1:
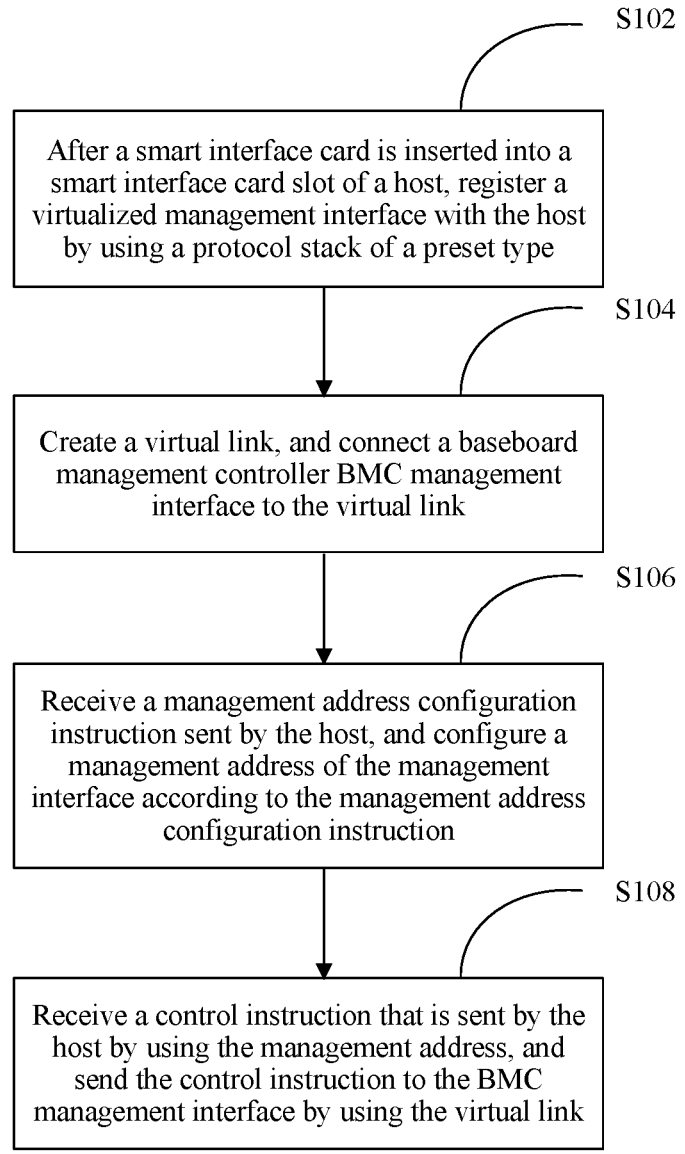
FIG. 1 is a flowchart of a smart interface card control method according to an embodiment of the present invention.

As shown in FIG. 1, the method includes the following steps.

Step S102. After a smart interface card is inserted into a smart interface card slot of a host, register a virtualized management interface with the host by using a protocol stack of a preset type.

The smart interface card slot of the host may be an interface slot of multiple types, for example, may include but is not limited to a Peripheral Component Interconnect Express (PCIE) interface slot or a Universal Serial Bus (USB) interface slot. Before the smart interface card is inserted into the host, a driver needs to be installed on the host. After the driver is installed, when the smart interface card is inserted into the smart interface card slot of the host, the host may detect the device, and wait for the smart interface card to be registered as a device.

In this embodiment, different from a conventional technology, when the smart interface card is registered with the host as a device, the smart interface card is not registered with the host as a smart interface card SIC device, but is registered as another device by using the protocol stack of the preset type. For example, a type of the protocol stack may include but is not limited to: an Ethernet interface, a small computer system interface SCSI (Small Computer System Interface), a Universal Serial Bus USB interface, an Inter-Integrated Circuit (I2C, a two-line serial bus developed by Philips) interface, an LPC (Low Pin Count, an interface specification defined by the Intel company for replacing a conventional ISA BUS) interface, or the like.

That is, if the protocol stack of the preset type is an Ethernet interface type, when the smart interface card is registered as a device, registration is performed by simulating a network device to send the protocol stack of the Ethernet interface type to the host for registration. After the registration is complete, the host considers the smart interface card as a remote network device connected to a network port.

If the protocol stack of the preset type is a SCSI type, when the smart interface card is registered as a device, registration is performed by simulating a storage device to send, to the host, a protocol stack that is required for registration of a SCSI device. After the registration is complete, the host considers the smart interface card as a storage device that supports the SCSI protocol.

Step S104. Create a virtual link, and connect a baseboard management controller BMC management interface to the virtual link.

Step S106. Receive a management address configuration instruction sent by the host, and configure a management address of the management interface according to the management address configuration instruction.

Step S108. Receive a control instruction that is sent by the host by using the management address, and send the control instruction to the BMC management interface by using the virtual link.

In an existing Intelligent Platform Management Interface (IPMI), which is an industry standard used for managing a peripheral device used in an Intel structure-based enterprise system, where the standard is formulated by companies such as Intel, Hewlett Packard, NEC, Dell, and SuperMicro, and a user may use the IPMI to monitor physical health features such as temperature, voltage, fan working status, and power supply status of a server) framework, a specific communication method is defined for an embedded management subsystem. IPMI information is exchanged by using a baseboard management controller (BMC) (located on a hardware component complying with IPMI specifications).

In this embodiment, to implement, in the IPMI framework, management by means of sending a message to the BMC, the smart interface card creates the virtual link from the virtualized management interface to the BMC management interface. For example, the BMC management interface supports the Ethernet interface, and the smart interface card creates a virtual network link, creates a virtual local area network, and adds a MAC address (an Ethernet identifier) of the BMC management interface to the virtual local area network. When the smart interface card receives, by using the slot, a message sent by the host, the smart interface card does not need to transmit the message to a BMC module by using a specific bottom-layer line or a register, but transmits, at an upper layer, the message to the BMC module by means of software simulation on the smart interface card.

The following separately describes, with reference to two embodiments, processes in which the smart interface card is registered with the host and the host manages the smart interface card when the protocol stack type of the virtualized management interface is the Ethernet interface and when the protocol stack type of the virtualized management interface is the SCSI.

Embodiment 1

In this embodiment, a type of a smart interface card slot is a PCIE interface slot. The registering a virtualized management interface with the host by using a protocol stack of a preset type comprise: registering the virtualized management interface on a PCIE interface of the host by using the protocol stack of the preset type.

Figure 2:
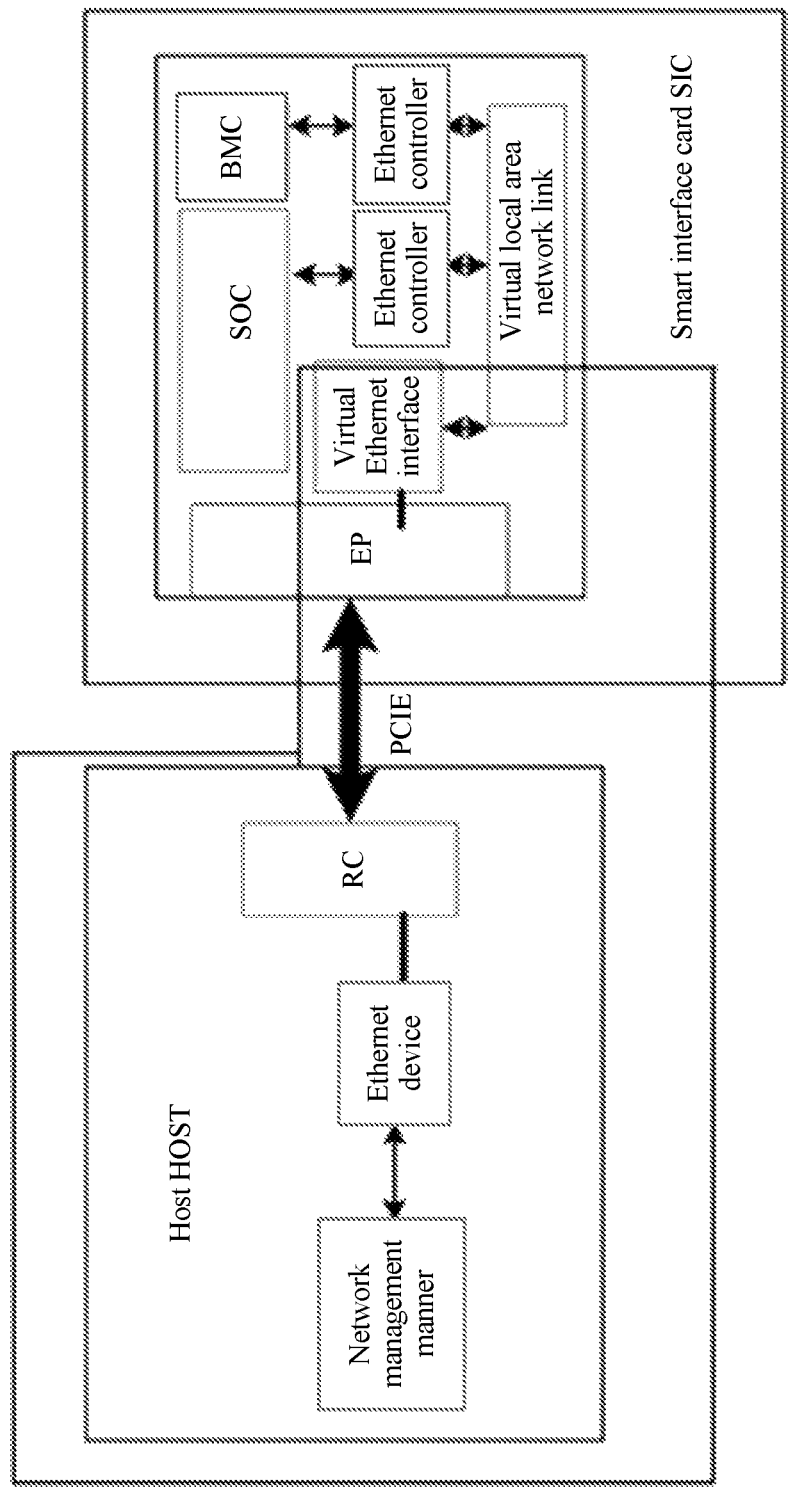
FIG. 2 is a schematic diagram of a virtual local area network link in a PCIE endpoint scenario according to an embodiment of the present invention.

As shown in FIG. 2, in a PCIE architecture, the host is a root node (RC) of the PCIE, and the interface card is an endpoint (EP) of the PCIE. One EP may implement different function (FUNCTION) channels, including a service channel and a management channel. This embodiment is merely used to describe a process in which the host manages the smart interface card. Therefore, in FIG. 2, a function that is of the service channel of the smart interface card and that is presented for the host is not shown, and only a function that is of the management channel and that is presented for a service is shown.

Likewise, as shown in FIG. 2, in this embodiment, the protocol stack type of the virtualized management interface is an Ethernet interface, and the smart interface card is additionally registered with the host as a network adapter device by simulating a protocol stack that is used for registration of a network adapter device. That is, for a host side, the host can not only find that the smart interface card device is inserted into the PCIE slot and then perform service processing related to the smart interface card, but also find that the network adapter device is inserted into the PCIE slot and then send a control instruction to the smart interface card by using the network adapter device for management. The smart interface card implements an Ethernet interface (NIC dev) of the host by simulating registration of a network adapter. That is, after the smart interface card is inserted, the Ethernet interface that is specially used for management may be seen on the host.

In this embodiment, the smart interface card may create a virtual local area network link, and connect an Ethernet interface of the BMC management interface to the virtual local area network link.

The sending the control instruction to the BMC management interface by using the virtual link comprise: sending the control instruction to the Ethernet interface of the BMC management interface by using the virtual local area network link.

That is, different from a common Ethernet interface that needs to be connected to an actual physical network by using a twisted pair or an optical fiber, the Ethernet interface (NIC dev) registered by the smart interface card with the host is connected to a virtual link vnetlink that is obtained by means of virtualization by a computer program inside the smart interface card. The host communicates with the smart interface card by using a PCIE slot interface, and transmits network data. After receiving the data, the smart interface card transmits, at an upper layer and by using a computer program on the smart interface card, the data to the BMC management interface inside the smart interface card by using the virtual local area network link vnetlink.

Further, the creating a virtual local area network link further includes: connecting an Ethernet interface of a system on chip SoC (system on chip) management interface to the virtual local area network link. As shown in FIG. 2, the Ethernet interface of an SOC that manages a main chip of the smart interface card is also connected to the virtual local area network link vnetlink at an upper layer in a software simulation manner, and the host may also manage the main chip of the smart interface card by using a network.

In this embodiment, the configuring a management address of the management interface according to the management address configuration instruction comprise: configuring an Internet Protocol IP address of the management interface according to the management address configuration instruction.

The receiving a control instruction that is sent by the host by using the management address comprise: receiving a Remote Management Control Protocol RMCP (Remote Management Control Protocol)-based control instruction that is sent by the host by using the configured IP address.

In this embodiment, when the smart interface card is registered with the host as a network adapter device, a unique device identifier may be used. Alternatively, the driver of the host first determines whether a smart interface card has been registered. If a smart interface card has been registered, the same Ethernet interface (NIC CRTL host) created by the driver of the host is used to perform management. That is, if multiple smart interface cards are respectively inserted into multiple PCIE slots of the host, each of the multiple smart interface cards is registered with the host as a virtual network adapter device. However, the host side may display only one network adapter device, but allocate different IP addresses to the multiple smart interface cards. The host still performs management by using the unique Ethernet interface (NIC dev), but the driver of the host distinguishes between different smart interface card devices by using IP addresses.

Figure 3:
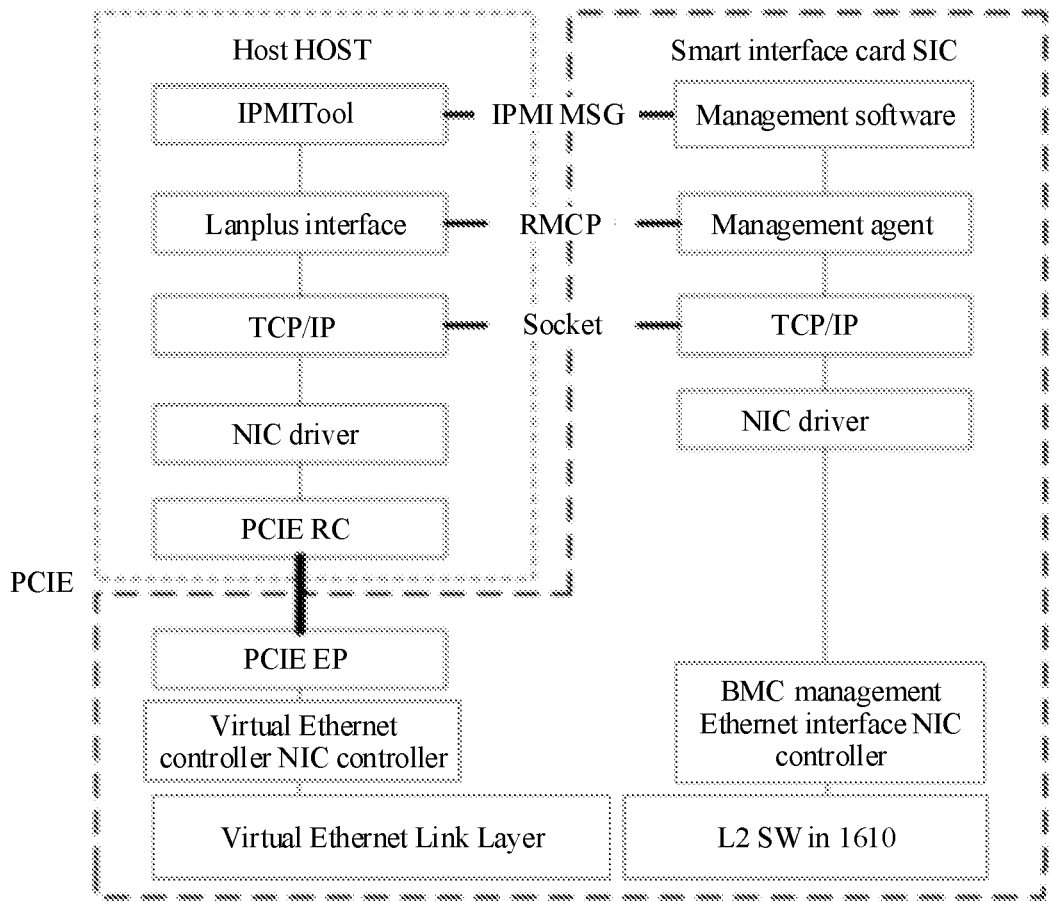
FIG. 3 is a data flow diagram in which a host transmits a message to a BMC on a smart interface card by using a network according to an embodiment of the present invention.
Figure 4:
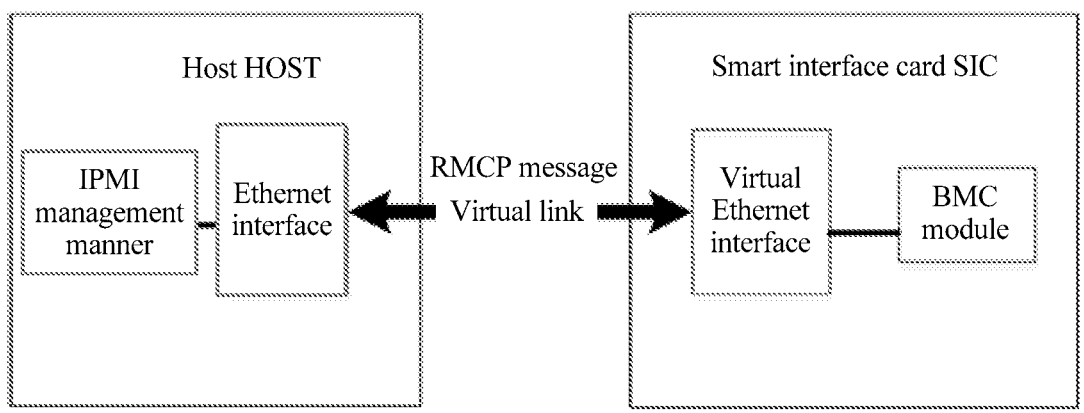
FIG. 4 is a schematic diagram in which a host manages a smart interface card in an IPMI framework according to an embodiment of the present invention.

The host side may also connect an allocated IP address (corresponding to the virtual link) to an external management network by using a bridge function provided by a standard OS, and add the smart interface card to the management network of a data center level. When the management network manages the smart interface card on the host, refer to FIG. 3 and FIG. 4. A control instruction is sent by using the RMCP protocol, and the control instruction is transmitted by using a TCP/IP link. However, at a bottom layer, the control instruction is still transmitted to the smart interface card by using the virtual network adapter device on the PCIE slot. After receiving the control instruction at the endpoint EP of the PCIE interface, the smart interface card transmits the control instruction to a virtual local area network that is of an upper-layer application and that is simulated by using a computer program, and therefore, may transmit the control instruction to the Ethernet interface of the BMC to which a TCP/IP link is also established, so that a function of managing, by the management network, the smart interface card by using the RMCP protocol is implemented, and the smart interface card may be managed by using the IPMI framework.

Embodiment 2

In this embodiment, a type of a smart interface card slot is a PCIE interface slot. The virtualized management interface that is registered with the host by using the protocol stack of the preset type is a SCSI.

Figure 5:
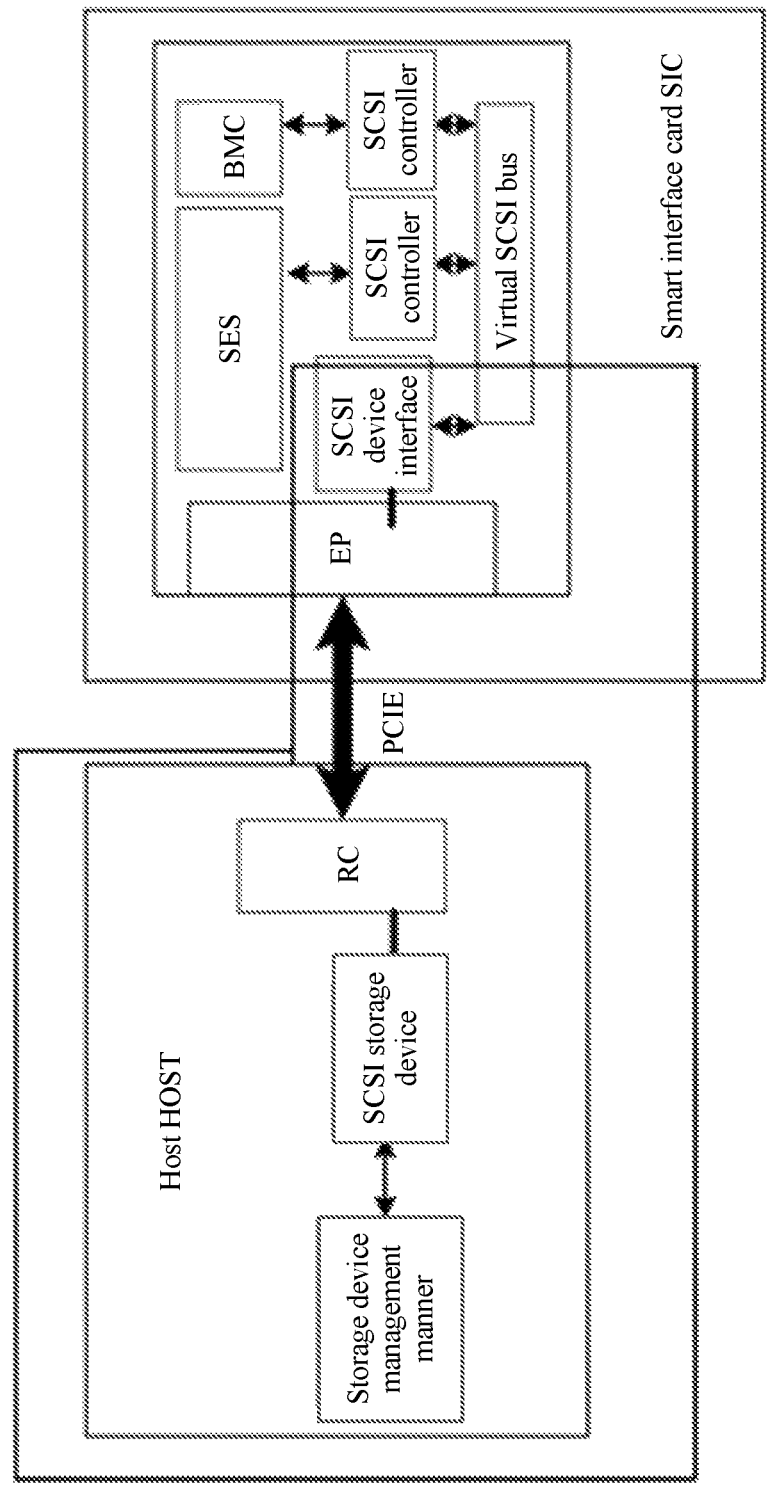
FIG. 5 is a schematic diagram of a virtual SCSI bus in a PCIE endpoint EP scenario according to an embodiment of the present invention.

As shown in FIG. 5, in a PCIE architecture, the host is a root node (RC) of the PCIE, and the interface card is an endpoint (EP) of the PCIE. One EP may implement different function (FUNCTION) channels, including a service channel and a management channel. This embodiment is merely used to describe a process in which the host manages the smart interface card. Therefore, in FIG. 5, a function that is of the service channel of the smart interface card and that is presented for the host is not shown, and only a function that is of the management channel and that is presented for a service is shown.

Likewise, as shown in FIG. 5, in this embodiment, the protocol stack type of the virtualized management interface is a SCSI, and the smart interface card is registered with the host as a SCSI storage device (for example, a hard disk, or a tape drive) by simulating a protocol stack that is used for registration of a SCSI storage device. That is, for a host side, the host can not only find that the smart interface card device is inserted into the PCIE slot and then perform service processing related to the smart interface card, but also find that the storage device is inserted into the PCIE slot and then send a control instruction to the smart interface card by using the virtual storage device for management. The smart interface card implements a SCSI storage device access interface (SCSI dev) of the host by simulating registration of a storage device. That is, after the smart interface card is inserted, the SCSI that is specially used for management may be seen on the host.

In this embodiment, the creating a virtual link, and connecting a baseboard management controller BMC management interface to the virtual link comprise: creating a virtual SCSI bus, and connecting the BMC management interface to the virtual SCSI bus.

The sending the control instruction to the BMC management interface by using the virtual link comprise: sending the control instruction to the BMC management interface by using the virtual SCSI bus.

That is, different from a common SCSI interface that needs to be connected to an actual storage device by using a hard disk cable or a data transmission line, the storage device access interface (SCSI dev) registered by the smart interface card with the host is connected to a virtual SCSI bus vscsilink that is obtained by means of virtualization by a computer program inside the smart interface card. The host communicates with the smart interface card by using a PCIE slot interface, and transmits the control instruction by using the SCSI protocol. After receiving the data, the smart interface card transmits, at an upper layer and by using a computer program on the smart interface card, the data to the BMC management interface inside the smart interface card by using the virtual SCSI bus vscsilink.

In this embodiment, the configuring a management address of the management interface according to the management address configuration instruction comprise: configuring a SCSI read/write address of the management interface according to the management address configuration instruction.

The receiving a control instruction that is sent by the host by using the management address comprise: receiving a SCSI access request that includes the control instruction and that is sent by the host by using the configured SCSI read/write address.

In this embodiment, when the smart interface card is registered with the host as a SCSI storage interface, a unique device identifier may be used. Alternatively, the driver of the host first determines whether a smart interface card has been registered. If a smart interface card has been registered, the same SCSI storage interface created by the driver of the host is used to perform management. That is, if multiple smart interface cards are respectively inserted into multiple PCIE slots of the host, each of the multiple smart interface cards is registered with the host as a virtual SCSI storage interface. However, the host side may display only one SCSI storage interface, but allocate different SCSI read/write addresses (that is, SCSI identifiers, where one SCSI bus may include multiple SCSI devices, and the SCSI identifiers may be used to distinguish between the multiple inserted smart interface cards) to the multiple smart interface cards. The host still performs management by using the unique SCSI storage interface, but the driver of the host distinguishes between different smart interface card devices by using different SCSI identifiers.

Figure 6:
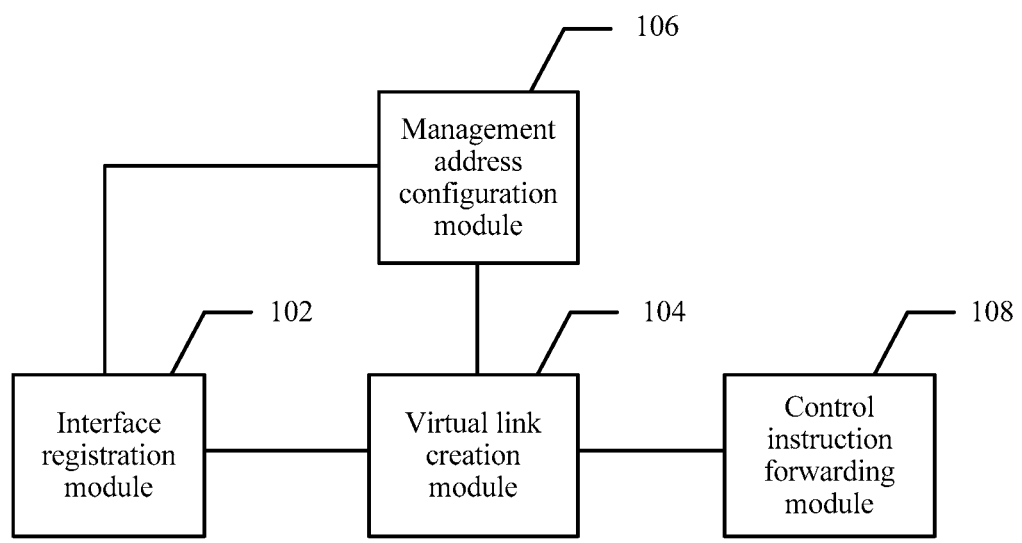
FIG. 6 is a schematic diagram of a smart interface card control apparatus according to an embodiment of the present invention.

To resolve the foregoing problem, in a conventional technology, that scalability is poor because an in-band or an out-of-band management manner of a smart interface card is not applicable to a server of a common type, in an embodiment, a smart interface card control apparatus is specially provided. As shown in FIG. 6, the apparatus includes an interface registration module 102, a virtual link creation module 104, a management address configuration module 106, and a control instruction forwarding module 108.

The interface registration module 102 is configured to register, after a smart interface card is inserted into a smart interface card slot of a host, a virtualized management interface with the host by using a protocol stack of a preset type.

The virtual link creation module 104 is configured to: create a virtual link, and connect a baseboard management controller BMC management interface to the virtual link.

The management address configuration module 106 is configured to: receive a management address configuration instruction sent by the host, and configure a management address of the management interface according to the management address configuration instruction.

The control instruction forwarding module 108 is configured to: receive a control instruction that is sent by the host by using the management address, and send the control instruction to the BMC management interface by using the virtual link.

In this embodiment, a protocol stack type of the virtualized management interface includes one of an Ethernet interface, a small computer system interface SCSI, a Universal Serial Bus USB interface, an I2C interface, or an LPC interface. A type of the smart interface card slot includes a PCIE interface slot or a USB interface slot.

In an embodiment, the type of the smart interface card slot is a PCIE interface slot. The interface registration module 102 is further configured to register the virtualized management interface on a PCIE interface of the host by using the protocol stack of the preset type.

In an embodiment, the protocol stack type of the virtualized management interface is an Ethernet interface. The virtual link creation module 104 is further configured to: create a virtual local area network link, and connect an Ethernet interface of the BMC management interface to the virtual local area network link.

The control instruction forwarding module 108 is further configured to send the control instruction to the Ethernet interface of the BMC management interface by using the virtual local area network link.

In an embodiment, the virtual link creation module 104 is further configured to connect an Ethernet interface of a system on chip SOC management interface to the virtual local area network link.

In an embodiment, the management address configuration module 106 is further configured to configure an Internet Protocol IP address of the management interface according to the management address configuration instruction. The control instruction forwarding module 108 is further configured to receive a Remote Management Control Protocol RMCP-based control instruction that is sent by the host by using the configured IP address.

In an embodiment, the protocol stack type of the virtualized management interface is a SCSI. The virtual link creation module 104 is further configured to: create a virtual SCSI bus, and connect the BMC management interface to the virtual SCSI bus. The control instruction forwarding module 108 is further configured to send the control instruction to the BMC management interface by using the virtual SCSI bus.

In an embodiment, the management address configuration module 106 is further configured to configure a SCSI read/write address of the management interface according to the management address configuration instruction. The control instruction forwarding module 108 is further configured to receive a SCSI access request that includes the control instruction and that is sent by the host by using the configured SCSI read/write address.

Implementation of the present invention brings about the following beneficial effects:

In comparison with the in-band management manner in the conventional technology, according to the foregoing smart interface card control method and apparatus, there is no need to dispose a separate register on the smart interface card, there is no need to install management software on the host side, and the host may directly send, by using a network or the SCSI, a control instruction that complies with a general protocol, to manage the smart interface card. In comparison with the out-of-band management manner, the smart interface card directly communicates with the host by using the slot, and there is no need to occupy an additional device resource of the host. A host without an I2C interface can still perform management. Therefore, scalability is improved.

In addition, in comparison with the out-of-band management manner, the host may manage the smart interface card by using a high-bandwidth management channel such as a network or the SCSI. Bandwidth of the management channel is greatly improved when compared with that of an I2C management channel in the original out-of-band management manner.

In addition, the host may directly access a smart interface card controller or an on-board BMC module of the smart interface card, and provide comprehensive management functions that are based on a standard IPMI framework. Further, because all management channels are virtualized based on a PCIE channel, a device type (a network device, a SCSI device, or the like) that is of the smart interface and that is presented for the host can be changed by modifying software configuration. Therefore, application is more flexible, and scalability is also improved.

In addition, the host may connect a virtual link inside the smart interface card to an external management network by using a bridge function provided by a standard OS, and add the smart interface card to the management network of a data center level, so that the management network can conveniently manage smart interface cards on multiple hosts.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), a random access memory (RAM), or the like.

The foregoing embodiments merely describe several implementations of the present invention, and description of the implementations is relatively specific and detailed, but shall not be understood as a limitation on the scope of the present invention. It should be noted that a person of ordinary skill in the art may make several variations and improvements without departing from the idea of the present invention and the variations and improvements shall fall within the protection scope of the present invention. Therefore, the protection scope of the present invention shall be subject to the protection scope of the claims.

What is claimed is:

1. A smart interface card control method, comprising:
when a smart interface card is inserted into a smart interface card slot of a host, registering a virtualized management interface with the host by using a protocol stack of a preset type;
creating a virtual link from the virtualized management interface to a baseboard management controller (BMC) management interface, wherein the BMC management interface belongs to the smart interface card;
receiving a management address configuration instruction sent by the host;
configuring a management address of the BMC management interface according to the management address configuration instruction; and
receiving a control instruction that is sent by the host by using the management address, and sending the control instruction to the BMC management interface by using the virtual link; and, wherein
the type of the smart interface card slot includes a Peripheral Component Interconnect Express (PCIE) interface slot or a USB interface slot; and
registering the virtualized management interface with the host by using a protocol stack of a preset type comprise:
registering the virtualized management interface on a PCIE interface or the USB interface slot of the host by using the protocol stack of the preset type.

2. The smart interface card control method according to claim 1, wherein the protocol stack type of the virtualized management interface comprises one of an Ethernet interface, a small computer system interface (SCSI), a Universal Serial Bus (USB) interface, an Inter-integrated Circuit (I2C) interface, or an low pin count (LPC) interface.

3. The smart interface card control method according to claim 1, wherein the protocol stack of the preset type of the virtualized management interface is an Ethernet interface; and, wherein
creating the virtual link, and connecting the baseboard management controller BMC management interface to the virtual link comprise:
creating a virtual local area network link, and connecting an Ethernet interface of the BMC management interface to the virtual local area network link; and
sending the control instruction to the BMC management interface by using the virtual link comprise:
sending the control instruction to the Ethernet interface of the BMC management interface by using the virtual local area network link.

4. The smart interface card control method according to claim 3, wherein the creating the virtual local area network link further comprises:
connecting an Ethernet interface of a system on chip (SOC) management interface to the virtual local area network link.

5. The smart interface card control method according to claim 1, wherein the protocol stack of the preset type of the virtualized management interface is a SCSI; and, wherein
creating the virtual link, and connecting a baseboard management controller (BMC) management interface to the virtual link comprises:
creating a virtual SCSI bus, and connecting the BMC management interface to the virtual SCSI bus; and
sending the control instruction to the BMC management interface by using the virtual link comprises:
sending the control instruction to the BMC management interface by using the virtual SCSI bus.

6. The smart interface card control method according to claim 5, wherein
configuring the management address of the BMC management interface according to the management address configuration instruction comprises:
configuring a SCSI read/write address of the BMC management interface according to the management address configuration instruction; and
receiving the control instruction that is sent by the host by using the management address comprises:
receiving a SCSI access request that comprises the control instruction and that is sent by the host by using the configured SCSI read/write address.

7. The smart interface card control method according to claim 1, wherein
configuring the management address of the BMC management interface according to the management address configuration instruction comprises:
configuring an Internet Protocol (IP) address of the BMC management interface according to the management address configuration instruction; and
receiving the control instruction that is sent by the host by using the management address comprise:
receiving a Remote Management Control Protocol (RMCP) control instruction that is sent by the host by using the configured IP address.

8. A host, comprising at least one smart interface card wherein the smart interface card comprise at least one communications interface, the at least one smart interface is configured to:
when a smart interface card is inserted into a smart interface card slot of a host, register a virtualized management interface with the host by using a protocol stack of a preset type;
create a virtual link from the virtualized management interface to a baseboard management controller (BMC) management interface, wherein the BMC management interface belongs to the smart interface card;
receive a management address configuration instruction sent by the host;
configure a management address of the BMC management interface according to the management address configuration instruction; and
receive a control instruction that is sent by the host by using the management address, and send the control instruction to the BMC management interface by using the virtual link; and, wherein
the type of the smart interface card slot includes a Peripheral Component Interconnect Express (PCIE) interface slot or a USB interface slot; and
registering the virtualized management interface with the host by using a protocol stack of a preset type comprise:
registering the virtualized management interface on a PCIE interface or the USB interface slot of the host by using the protocol stack of the preset type.

9. The host according to claim 8, wherein the protocol stack type of the virtualized management interface comprises one of an Ethernet interface, a small computer system interface (SCSI), a Universal Serial Bus (USB) interface, an Inter-integrated Circuit (I2C) interface, or an low pin count (LPC) interface.

10. The host according to claim 8, wherein the protocol stack of the preset type of the virtualized management interface is an Ethernet interface; and, wherein
creating the virtual link, and connect the baseboard management controller BMC management interface to the virtual link comprises:
creating a virtual local area network link, and connect an Ethernet interface of the BMC management interface to the virtual local area network link; and
sending the control instruction to the BMC management interface by using the virtual link comprises:
sending the control instruction to the Ethernet interface of the BMC management interface by using the virtual local area network link.

11. The host according to claim 10, wherein creating the virtual local area network link further comprises:
connecting the Ethernet interface of a system on chip (SOC) management interface to the virtual local area network link.

12. The host according to claim 8, wherein the protocol stack type of the virtualized management interface is a SCSI; and, wherein
creating the virtual link, and connecting the baseboard management controller BMC management interface to the virtual link comprises:
creating a virtual SCSI bus, and connect the BMC management interface to the virtual SCSI bus; and
sending the control instruction to the BMC management interface by using the virtual link comprises:
sending the control instruction to the BMC management interface by using the virtual SCSI bus.

13. The host according to claim 12, wherein
configuring a management address of the BMC management interface according to the management address configuration instruction comprises:
configuring a SCSI read/write address of the BMC management interface according to the management address configuration instruction; and
receiving a control instruction that is sent by the host by using the management address comprises:
receiving a SCSI access request that comprises the control instruction and that is sent by the host by using the configured SCSI read/write address.

14. The host according to claim 8, wherein
configuring the management address of the BMC management interface according to the management address configuration instruction comprise:
configuring an Internet Protocol IP address of the BMC management interface according to the management address configuration instruction; and
receiving the control instruction that is sent by the host by using the management address comprise:
receiving a Remote Management Control Protocol (RMCP) control instruction that is sent by the host by using the configured IP address.

15. A non-transitory computer-readable storage medium comprising instructions which, when executed by a computer, cause the computer to carry out steps: when a smart interface card is inserted into a smart interface card slot of a host, registering a virtualized management interface with the host by using a protocol stack of a preset type; creating a virtual link, and connecting a baseboard management controller (BMC) management interface to the virtual link; receiving a management address configuration instruction sent by the host, and configuring a management address of the BMC management interface according to the management address configuration instruction; and receiving a control instruction that is sent by the host by using the management address, and sending the control instruction to the BMC management interface by using the virtual link; and, wherein
the type of the smart interface card slot includes a Peripheral Component Interconnect Express (PCIE) interface slot or a USB interface slot; and
registering the virtualized management interface with the host by using a protocol stack of a preset type comprise:
registering the virtualized management interface on a PCIE interface or the USB interface slot of the host by using the protocol stack of the preset type.

* * * * *